Dec. 1, 1942.  M. F. KENT  2,303,883
DYNAMO-ELECTRIC MACHINE
Filed Sept. 24, 1941
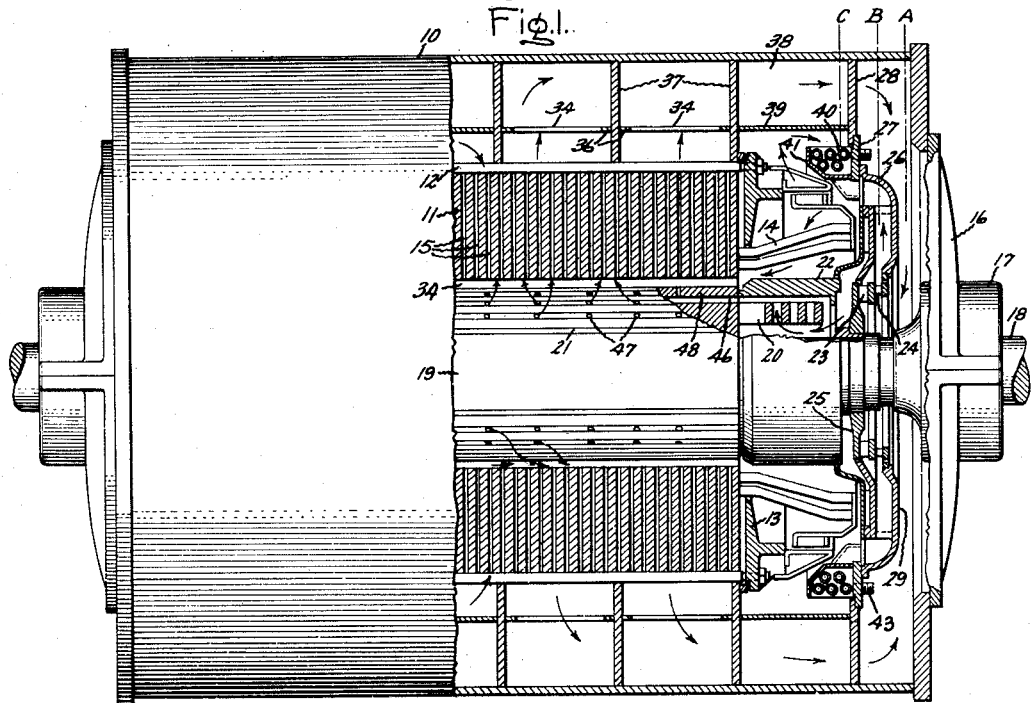
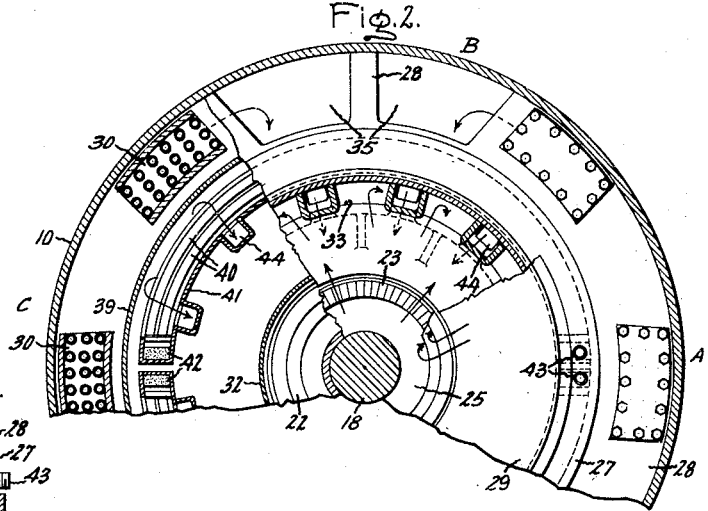
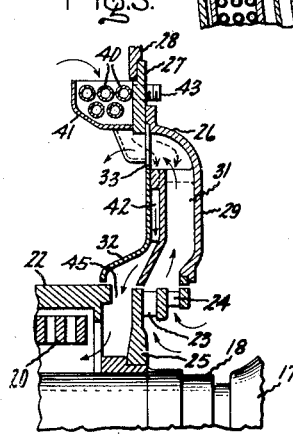
Inventor:
Milton F. Kent,
by Harry E. Dunham
His Attorney.

Patented Dec. 1, 1942

2,303,883

UNITED STATES PATENT OFFICE 2,303,883

DYNAMOELECTRIC MACHINE

Milton F. Kent, Schenectady, N. Y., assignor to General Electric Company, a corporation of New York Application September 24, 1941, Serial No. 412,125

11 Claims. (Cl. 171—252)

My invention relates to improvements in dynamo-electric machines and more particularly to constructions for improving the ventilation thereof.

An object of my invention is to provide an improved dynamo-electric machine ventilating system.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view, partly in section, of a dynamo-electric machine embodying my invention; Fig. 2 is an end view of the machine shown in Fig. 1 with portions broken away at sections A, B, and C as shown in Fig. 1; and Fig. 3 is an enlarged sectional view showing the relative arrangement of the impeller, end shield passages, cooler, and a portion of the rotatable member shown in Fig. 1.

Referring to the drawing, I have shown a dynamo-electric machine including a stationary member having an outer frame 10 in which is supported a stationary member core 11 of magnetic material. The core is formed of a plurality of laminations which are retained in assembled relationship by clamping bolts 12 which secure end plates 13 about the ends of the assembled laminations. A stationary member armature winding 14 is arranged in winding slots formed in the core 11 and the entire stationary member core and winding are adapted to be cooled by a ventilating medium which is circulated about the end turns of the winding 14 and through radial ventilating passages 15 formed between laminations of the core 11. The stationary member is provided with an outer end shield 16 at each end thereof having a bearing member 17 arranged to support a rotatable member shaft 18.

The rotatable member is adapted to provide a rotating field for exciting the stationary armature winding 14 and includes a core member 19 of magnetic material mounted on the shaft 18 and is adapted to be excited by a field exciting winding 20 arranged in radially extending slots 21 in the core 19. The end turns of the winding 20 are retained in position by a retaining end ring 22 arranged about the end turns at each end of the rotatable member.

In order to circulate ventilating medium through the machine, a ventilating medium impeller having impeller blades 23 and 24 supported on an impeller ring 25 is mounted on the rotatable member of the machine and is adapted to be driven thereby. A stationary inner end shield 26 is mounted on a stationary ring 27 secured to a stiffening plate 28 of the stationary member frame 10 and is provided with an outer plate 29 adapted to guide ventilating medium to the intake side of the impeller and from the exhaust side of the impeller to the interior of the machine. As is indicated by the arrows in Fig. 3, and in sections A and B of Fig. 2, the ventilating medium passes through coolers 30 of a conventional type extending through the stiffening plate 28 and around the outer plate 29 to the intake side of the impeller blades 23 and 24, from which it is blown through passages 31 formed in the inner end shield 26 between the outer plate 29 and an inner plate 32 of the end shield, through openings 33 formed in the inner plate 32, to the interior of the machine. The ventilating medium then passes over the end turns of the stationary armature winding 14 and into an air gap 34 between the rotatable member core 19 and the stationary member core 11 and circulates through the radial openings 15 of the stationary member outwardly through openings 34 and 35 in the inner stiffening plate members 36 and 37 of the stationary member frame 10. The ventilating medium then passes through a compartment 38 formed between the outer frame 10 and an inner plate 39 through the openings 30 in the stiffening plate 28, and is recirculated by the ventilating medium impeller.

It has been found that the rotatable member of this type dynamo-electric machine tends to become hotter than the stationary member. If the ventilating medium circulated through the rotatable member is cooled by a suitable heat transfer device or cooler below the temperature of the cooling medium circulated over the stationary member of the machine, the capacity of a given size machine can be increased considerably. In the past it has been customary to increase the capacity of a machine by placing the cooler in the path of the ventilating medium which is circulated through the machine such that all of the ventilating medium is cooled by the cooler. This results in a considerably larger cooler than is necessary to provide th.. desired cooling, as the machine rating can be increased substantially even if only the ventilating medium circulated through the rotatable member is cooled by a surface cooler.

In order to provide the desired cooling of the ventilating medium circulated through the rotatable member of the machine, I provide a finned tube surface cooler or heat transfer device including tubes 40 arranged arcuately in a cooler casing 41 mounted on the stationary ring 27 adjacent each end of the machine on the inner end shield 26. A cooling fluid, such as water or brine, is adapted to be supplied to the tubes 40 through headers 42 connected to a cooling fluid supply by pipes 43 and this cooling fluid is refrigerated or cooled to a temperature below that of the fluid in the conventional coolers 30 when these are used. This lower temperature may be obtained by any suitable refrigerating device. The ventilating medium which is adapted to cool the rotatable member of the machine is by-passed through the cooler 40, which is in the path of flow of a part of the ventilating medium circulated by the impeller, and this cooled ventilating medium comprises about a one-third part of the total ventilating medium circulated through the machine by the impeller. This is the only part of the ventilating medium which is cooled or refrigerated by this latter cooler and is conducted from the cooler through passages 44 formed in the inner end shield 26 into a chamber 45 formed about each end of the rotatable member between the end shield 26 and the impeller ring 25 in communication with axially extending ventilating passages 46 in the rotatable member. In open type air cooled machines, a similar increase in capacity can be obtained by cooling the ventilating medium circulated through the rotatable member, even though the temperature of the air circulated through the stationary member is at room temperature. A clearance seal is formed between the various plates of the end shield 26 and the cooperating elements of the rotatable member to insure that substantially all of the ventilating medium passes in the desired direction through the various conducting passages of the end shield. The part of the ventilating medium which is cooled passes from the chamber 45 around the end turns of the rotatable member winding 20 into the axially extending passages 46 in the rotatable member core above the winding 20 and out through radially extending openings 47 formed in slot wedges 48 which close the tops of the axially extending passages 46. The ventilating medium which passes from the openings 47 unites with the ventilating medium passing through the air gap 34 and passes through the stationary member of the machine to be exhausted from the machine if it be of the open type or to be recirculated by the impeller as stated above and as indicated by the arrows in the various figures of the drawing if the machine be of the closed type.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamo-electric machine having a stationary member and a rotatable member with ventilating passages therethrough, an impeller arranged to circulate ventilating medium through said stationary and said rotatable members, means formed to conduct a part of the ventilating medium circulated by said impeller to said rotatable member ventilating passages, and heat transfer means arranged in the path of flow of only said part of the ventilating medium circulated by said impeller through said rotatable member.

2. A dynamo-electric machine having a stationary member and a rotatable member with ventilating passages through said members, an impeller arranged to circulate ventilating medium through said stationary and said rotatable member passages, means formed to conduct a part of the ventilating medium circulated by said impeller to said rotatable member ventilating passages, and means including a cooler arranged in the path of flow of substantially only said part of the ventilating medium circulated by said impeller through said rotatable member.

3. A dynamo-electric machine having a stationary member, and a rotatable member with ventilating passages therethrough, a ventilating medium impeller arranged to circulate ventilating medium through said stationary and said rotatable members, means formed to conduct a part of the ventilating medium circulated by said impeller to said rotatable member ventilating passages, and a ventilating medium cooler arranged in the path of flow of substantially only said part of the ventilating medium circulated by said impeller through said rotatable member.

4. A dynamo-electric machine having a stationary member and a rotatable member with a ventilating medium impeller arranged to circulate ventilating medium through said stationary and said rotatable members, means formed to provide a chamber about an end of said rotatable member in communication with said rotatable member ventilating passages, a ventilating medium cooler arranged in the path of flow of only a part of the ventilating medium circulated by said impeller, and means providing a communication between said cooler and said chamber for conducting cooled ventilating medium from said cooler to said chamber for passage through said rotatable member.

5. A dynamo-electric machine having a stationary member and a rotatable member with ventilating passages therethrough, a ventilating medium impeller arranged to circulate ventilating medium through said stationary and said rotatable members of said machine, means for guiding a ventilating medium to the intake side of said impeller and for providing a chamber about an end of said rotatable member in communication with said rotatable member ventilating passages, a ventilating medium cooler arranged adjacent the exhaust side of said impeller in the path of flow of only a part of the ventilating medium circulated by said impeller, and means for conducting cooled ventilating medium from said cooler substantially only to said chamber for passage through said rotatable member.

6. A dynamo-electric machine having a stationary member and a rotatable member with ventilating passages therethrough, a ventilating medium impeller arranged to circulate ventilating medium through said stationary and said rotatable members of said machine, means including a stationary end shield member for providing a chamber about an end of said rotatable member in communication with said rotatable member ventilating passages, a ventilating medium cooler arranged in the path of flow of only a part of the ventilating medium circulated by said impeller, and means including passages in said end shield member communicating with said cooler and with said chamber for conducting cooled ventilating medium from said cooler substantially only to said chamber for passage through said rotatable member.

7. A dynamo-electric machine having a stationary member and a rotatable member with ventilating passages therethrough, a ventilating medium impeller arranged to circulate ventilating medium through said machine, means for guiding a ventilating medium to the intake side of said impeller and for providing a chamber about an end of said rotatable member in communication with said rotatable member ventilating passages, a ventilating medium cooler arranged in the path of flow of only a part of the ventilating medium circulated through said machine, and means for conducting cooled ventilating medium from said cooler substantially only to said chamber for passage through said rotatable member.

8. A dynamo-electric machine having a stationary member and a rotatable member with a ventilating medium impeller arranged to be driven by said rotatable member, means including an end shield member for guiding a ventilating medium to the intake side of said impeller, said end shield being formed to provide a chamber about an end of said rotatable member in communication with said rotatable member ventilating passages, a ventilating medium cooler arranged in the path of flow of only a part of the ventilating medium impelled by said impeller, and means providing a communication between said cooler and said chamber for conducting cooled ventilating medium from said cooler substantially only to said chamber for passage through said rotatable member.

9. A dynamo-electric machine having a stationary member and a rotatable member with ventilating passages therethrough, a ventilating medium impeller arranged to circulate ventilating medium through said stationary and said rotatable members of said machine, means including a stationary end shield member for guiding a ventilating medium to the intake side of said impeller and for providing a chamber about an end of said rotatable member in communication with said rotatable member ventilating passages, a ventilating medium cooler in the path of flow of only a part of the ventilating medium circulated by said impeller, and means including passages in said end shield member communicating with said cooler and with said chamber for conducting cooled ventilating medium from said cooler only to said chamber for passage through said rotatable member.

10. A dynamo-electric machine having a stationary member and a rotatable member with ventilating passages therethrough, a ventilating medium impeller arranged to circulate ventilating medium through said machine, means including a stationary end shield member for guiding a ventilating medium to the intake side of said impeller, heat transfer means arranged in the path of flow of a part of the ventilating medium circulated through said machine, and means including passages in said end shield member communicating with said heat transfer means for conducting ventilating medium from said heat transfer means substantially only to said rotatable member.

11. A dynamo-electric machine having a stationary member and a rotatable member with ventilating passages therethrough, a ventilating medium impeller on said rotatable member for circulating ventilating medium through said stationary and said rotatable members, means including a stationary end shield member for guiding a ventilating medium to the intake side of said impeller, said end shield being formed to provide a chamber about an end of said rotatable member in communication with said rotatable member ventilating passages, a ventilating medium cooler arranged adjacent the exhaust side of said impeller in the path of flow of only a part of the ventilating medium circulated in the interior of said dynamo-electric machine, and means including passages in said end shield member communicating with said cooler and with said chamber for conducting cooled ventilating medium from said cooler substantially only to said chamber for passage through said rotatable member.

MILTON F. KENT.